US012319433B2

(12) United States Patent
Au

(10) Patent No.: US 12,319,433 B2
(45) Date of Patent: Jun. 3, 2025

(54) DETERMINING THE STEERING ANGLE OF A LANDING GEAR ASSEMBLY OF AN AIRCRAFT

(71) Applicant: Airbus Operations Limited, Bristol (GB)

(72) Inventor: Ting Yu Au, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 223 days.

(21) Appl. No.: 17/954,154

(22) Filed: Sep. 27, 2022

(65) Prior Publication Data
US 2023/0094156 A1   Mar. 30, 2023

(30) Foreign Application Priority Data
Sep. 28, 2021   (GB) ..................................... 2113849

(51) Int. Cl.
*B64C 25/34*   (2006.01)
*B64C 25/50*   (2006.01)
(Continued)

(52) U.S. Cl.
CPC .......... *B64D 45/0005* (2013.01); *B64C 25/34* (2013.01); *B64C 25/50* (2013.01); *G01S 17/88* (2013.01)

(58) Field of Classification Search
CPC ..... B64D 45/0005; B64C 25/34; B64C 25/50; G01S 17/88
(Continued)

(56) References Cited

U.S. PATENT DOCUMENTS 8,042,765 B1   10/2011   Nance
9,671,314 B2   6/2017   Followell et al.
(Continued)

FOREIGN PATENT DOCUMENTS

DE   198 08 836        9/1999
DE   19808836 A1 *   9/1999   ................ B64F 1/22
(Continued)

OTHER PUBLICATIONS

He et al. "A Novel Way to Organize 3D LiDAR Point Cloud as 2D Depth Map Height Map and Surface Normal Map", 2015, IEEE Xplore, Conference on Robotics and Biomimetics, 1383-1388 (Year: 2015).*

(Continued)

*Primary Examiner* — Elaine Gort
*Assistant Examiner* — Preston Jay Miller
(74) *Attorney, Agent, or Firm* — Nixon & Vanderhye P.C.

(57) ABSTRACT

A method of determining the steering angle of a landing gear assembly of an aircraft is disclosed including scanning the landing gear assembly with a lidar system to generate a set of three-dimensional position data points, each position data point including a set of three orthogonal position values. A two-dimensional image from the set of three-dimensional position data points, by converting a position value of each of the three-dimensional position data points to an image property value of a set of image property values. A boundary of an area of the two-dimensional image of which each position data point has the same image property value is identified, where the area corresponds to a component of the landing gear assembly. The steering angle of the landing gear assembly is then determined from the shape and/or orientation of the identified boundary.

18 Claims, 9 Drawing Sheets

(51) Int. Cl.
*B64D 45/00* (2006.01)
*G01S 17/88* (2006.01)

(58) Field of Classification Search
USPC .......................................................... 701/3
See application file for complete search history.

(56) References Cited

U.S. PATENT DOCUMENTS

| | | | |
|---|---|---|---|
| 9,696,148 B2 | 7/2017 | Crow, Jr. | |
| 9,771,166 B2 | 9/2017 | Wilson et al. | |
| 10,160,536 B2 | 12/2018 | Necci et al. | |
| 10,317,533 B2 | 6/2019 | Cherepinsky et al. | |
| 2011/0147514 A1 | 6/2011 | Straub et al. | |
| 2017/0139045 A1* | 5/2017 | Cherepinsky | G01S 17/88 |
| 2018/0170531 A1 | 6/2018 | Cokonaj et al. | |
| 2019/0092493 A1* | 3/2019 | Franjou | B64F 1/22 |
| 2020/0070960 A1 | 3/2020 | Parker et al. | |
| 2020/0217658 A1 | 7/2020 | Abdelli | |
| 2020/0290750 A1* | 9/2020 | Ferrell | B64D 47/08 |
| 2021/0130008 A1 | 5/2021 | Schickling | |
| 2022/0396322 A1* | 12/2022 | Gudarzi | G06T 7/60 |

FOREIGN PATENT DOCUMENTS

| | | | | |
|---|---|---|---|---|
| EP | 2886465 A1 * | 6/2015 | ........... | B62D 15/024 |
| GB | 2587416 | 3/2021 | | |
| GB | 2587416 A * | 3/2021 | ............. | B64C 25/28 |

OTHER PUBLICATIONS

Fang et al. "Automatic registration of airborne LiDAR point cloud data and optical imagery depth map based on line and points features", 2015, Infrared Physics & Technology, vol. 71, pp. 457-463 (Year: 2015).*

Extended European Search Report for Application No. EP22197778.8, eight pages, dated Feb. 10, 2023.

Combined Search and Examination Report for GB Application No. 2113849.0 dated Mar. 14, 2022, 5 pages.

* cited by examiner

DETERMINING THE STEERING ANGLE OF A LANDING GEAR ASSEMBLY OF AN AIRCRAFT

CROSS RELATED APPLICATION

This application claims priority to United Kingdom Patent Application GB 2113849.0 filed Sep. 28, 2021, the entire contents of which is hereby incorporated by reference.

TECHNICAL FIELD

The present disclosure relates to methods and systems for determining the steering angle of a landing gear assembly of an aircraft, in particular using lidar ("light detection and ranging" or "laser imaging, detection, and ranging", also sometimes known as 3D laser scanning).

BACKGROUND OF THE INVENTION

It is known to use sensors to determine the steering angle of a landing gear assembly, particularly (but not exclusively) the nose landing gear. Conventionally this is done using a Rotary Variable Differential Transformer (RVDT) or Linear Variable Differential Transformer (LVDT). It is also known to use proximity sensors to determine the positon of components of a landing gear assembly, particularly to determine whether the landing gear assembly has been properly extended or retracted. It is also known to use other position sensing systems to determine the position of the components of a landing gear assembly. GB 2587416 A (Airbus Operations Limited) published 31 Mar. 2021 discloses the use of various sensing systems, including lidar systems, to determine the position of the components of a landing gear assembly.

However, it is not known, and has not been suggested, to use position-determining systems to determine the steering angle of a landing gear assembly. Further, experiments performed by the inventor have revealed that conventional computer vision techniques using camera images of landing gear are unable to determine the steering angle under some dark or bright conditions, or were able to make a determination only with some limitations. (For the avoidance of doubt, these experiments do not form part of the state of the art.)

The present invention seeks to solve or mitigate some or all of the above-mentioned problems. Alternatively and/or additionally, the present invention seeks to provide improved methods and systems for determining the steering angle of a landing gear assembly of an aircraft.

SUMMARY OF THE INVENTION

The present invention provides, according to a first aspect, a method of determining the steering angle of a landing gear assembly of an aircraft, the method comprising the steps of:
  scanning the landing gear assembly with a lidar system to generate a set of three-dimensional position data points, wherein each position data point comprises a set of three orthogonal position values;
  generating a two-dimensional image from the set of three-dimensional position data points, by converting a position value of each of the three-dimensional position data points to an image property value of a set of image property values;
  identifying a boundary of an area of the two-dimensional image of which each position data point has the same image property value, wherein the area corresponds to a component of the landing gear assembly;
  determining the steering angle of the landing gear assembly from the shape and/or orientation of the identified boundary.

By converting the three-dimensional lidar position data to a two-dimensional image by converting one position value to an image property value, different components of the landing gear assembly can be represented in the two-dimensional image as areas sharing the same image property value. A boundary of an area corresponding to a particular component can then be identified using standard imaging techniques. The steering angle can then be determined from the boundary, which will have a different shape and/or orientation depending on the steering angle, due to the movement of underlying component as the steering angle changes. It has been found that this method is effective in allowing the steering angle of the nose landing gear to be determined, particularly where the orientation of the boundary is used. In particular, it has been found that the steering angle can be determined under dark or bright conditions where conventional computer vision techniques have been found to be unable to do so.

The boundary of the area can be identified as a contour, i.e. a curve that joins all continuous points along the boundary, with the contour then being used in the later steps of the method. The contour may be found by following the boundary, or by any other suitable method.

Multiple areas with boundaries/contours may be identified. The largest identified area may be used to determine the steering angle of the landing gear assembly.

Where there are multiple areas in the two-dimensional image, the largest area may be used. This has been found to give the greatest accuracy.

The three orthogonal position values of the position data point may be a horizontal position value, a vertical position value and a depth position value. In this case, the depth position value may be indicative of a position along a line from the lidar system to the landing gear assembly. The converted position value may be the depth position value. This has been found to be particularly suitable when determining the steering angle, as the depth position value can be used particularly effectively to filter out irrelevant parts of the landing gear assembly and other parts of the aircraft.

The landing gear assembly may comprise one or more wheels, and the lidar system may be mounted above the one or more wheels of the landing gear assembly. This has been found to be particularly suitable for determining the steering angle.

The image property value for a position data point may be a colour value. This allows conventional image processing algorithms to be used.

Each image property value of the set of image property values may correspond to a range of the converted position values, and the converted position value of a three-dimensional position data point then converted to an image property value of the set of image property values when the converted position value is in the range of converted position values corresponding to the image property value. In this way, position values in the same range of positions can be converted to the same image property value. The landing gear assembly may comprise a torque link, and an image property value of the set of image property values may have a range of converted position values within which the torque link of the landing gear assembly is positioned when the landing gear assembly is extended. In this way, the position data points corresponding to the torque link are all converted to the same image property value. It has been found that the torque link is particularly effective to use to determine the steering angle, as it rotates with wheels of the landing gear assembly during steering, and has a metallic surface that is reliably scanned by lidar systems. The landing gear assembly may comprise one or more wheels, and the image property value of the set of image property values may have a range of converted position values within which the wheel or wheels of the landing gear assembly is positioned when the landing gear assembly is extended. However, it has been found that wheels are less reliably scanned by lidar systems, due to the rubber surface of their tyres reflecting light in a dispersed manner The lidar system may be positioned in the aircraft so that the lidar system scans the landing gear assembly from above. This has been found to be particularly suitable for determining the steering angle.

The method may further comprise, prior to the step of generating the two-dimensional image from the set of three-dimensional position data points, the step of removing three-dimensional position data points from the set of three-dimensional position data points that have a position value greater than a threshold value. Alternatively and/or additionally, the method may further comprise, prior to the step of generating the two-dimensional image from the set of three-dimensional position data points, the step of removing three-dimensional position data points from the set of three-dimensional position data points that have a converted position value less than a threshold value. This allows, for example, anything outside the area in which the landing gear assembly is extended, or outside the area of a particular component of the landing gear it is desirable to consider, for example the torque link, to be omitted.

The steering angle of the landing gear assembly may be determined from the orientation of the identified boundary by determining a best-fit line for the boundary. Many best-fit algorithms will be known to the skilled person, or could be adapted or new algorithms developed specially for use with the method.

The landing gear assembly may comprise a torque link, and the area of which the boundary is identified may correspond to the torque link of the landing gear assembly. As above, it has been found that the torque link is particularly effective to use to determine the steering angle.

The landing gear assembly may be the nose landing gear assembly.

The present invention provides, according to a second aspect, an aircraft comprising:
   a landing gear assembly;
   a lidar system arranged to scan the landing gear assembly and generate a set of three-dimensional position data points, wherein each position data point comprises a set of three orthogonal position values; and
   a computer system arranged to determine, from the set of three-dimensional position data points, the steering angle of the landing gear assembly in accordance with any of the methods described above.

Such a computer system may comprise a processor and memory, and may be a conventional computer system, a computer system specifically designed for use in aircraft, or any other suitable computer system.

The landing gear assembly may be the nose landing gear assembly.

The present invention provides, according to a third aspect, a non-transitory computer readable medium comprising computer-readable program code for determining the steering angle of a landing gear assembly of an aircraft, the computer-readable program code arranged, when executed in a computer system of an aircraft comprising:
   a landing gear assembly; and
   a lidar system arranged to scan the landing gear assembly and generate a set of three-dimensional position data points, wherein each position data point comprises a set of three orthogonal position values;
   to cause the computer system to determine, from the set of three-dimensional position data points, the steering angle of the landing gear assembly in accordance with the any of the methods described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 4b shows a colour-mapped image representing position data points obtained by a lidar scanner for the nose landing gear in the position shown in FIG. 4a;

DETAILED DESCRIPTION

Figure 1:
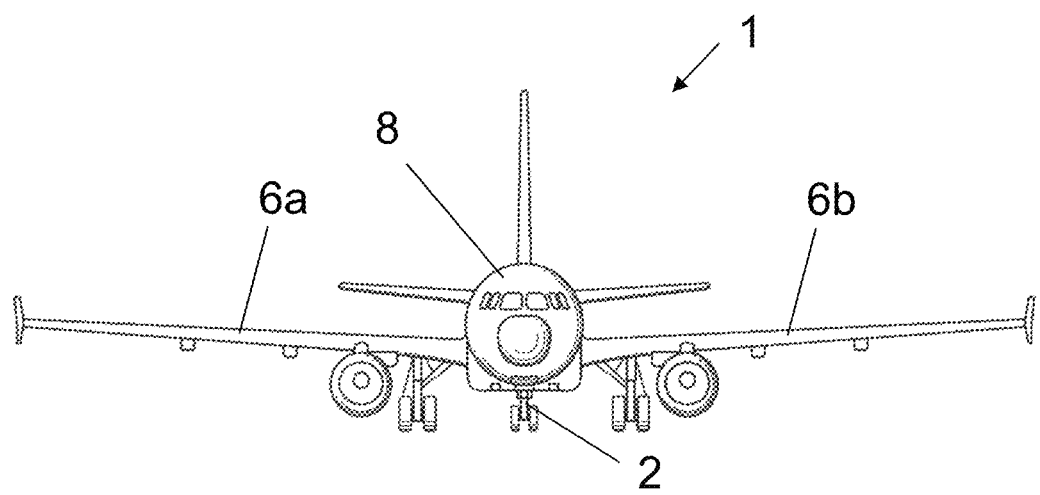
FIG. 1 shows a front and perspective view respectively of an aircraft including a system according to example embodiments of the invention.

FIG. 1 shows a front view of an aircraft 1 comprising a system in accordance with embodiments of the invention. The aircraft comprises a fuselage 8 with wings 6a and 6b mounted either side. As can be seen in particular from FIG. 1, a nose landing gear 2 mounted on the underside of the fuselage 8 is in extended configuration.

Figure 2:
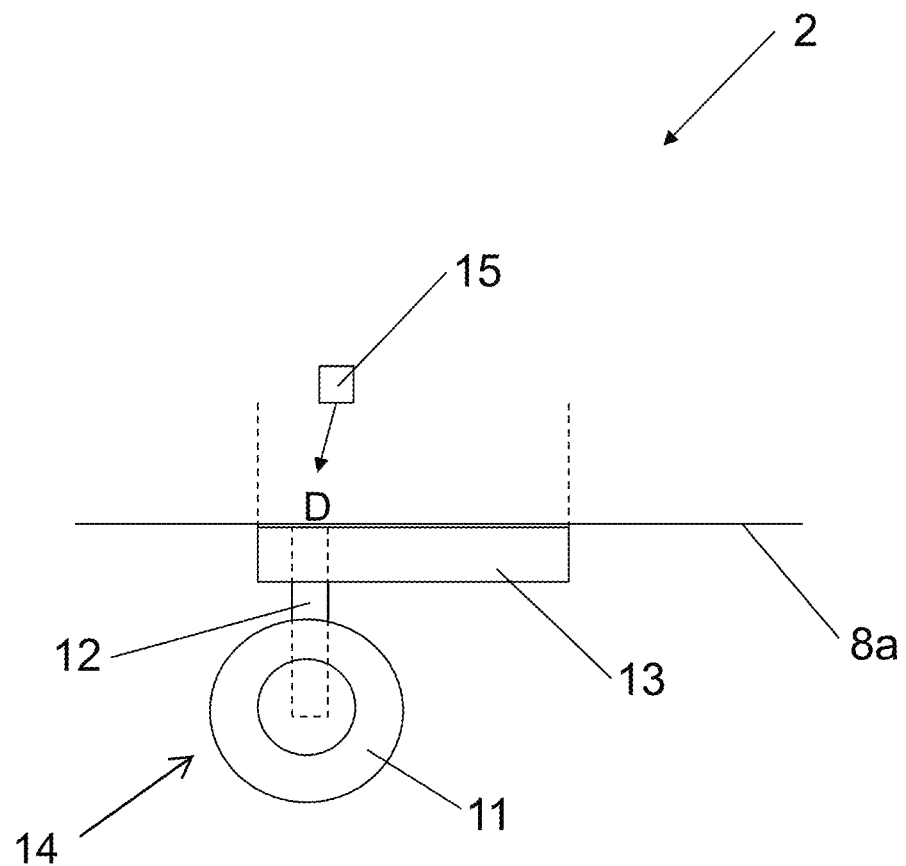
FIG. 2 shows a side view of the bottom part the fuselage of the aircraft in the area of the nose landing gear.

FIG. 2 shows a side view of the bottom part of the fuselage 8 in the area of the nose landing gear 2. As can be seen, the nose landing gear 2 comprises a wheel arrangement 14 comprising a wheel 11 mounted on a strut 12. A right-side (as viewed facing the nose of the aircraft 1) door 13 of the nose landing gear 2 in the underside 8a of the fuselage 8 is in the open position, so that the nose landing gear 2 has been able to extend. The nose landing gear 2 also comprises a corresponding left-side door, not shown, which is also in the open position.

A lidar scanner 15 is mounted inside the nose landing gear 2 space, above the level of the right-side door 13 (and corresponding left-side door), approximately directly above the wheel 11 when the nose landing gear 2 is extended. The lidar scanner 15 scans in the direction marked by the arrow D in FIG. 2, i.e. generally in the downwards direction towards the wheel 11. However, in other embodiments the lidar scanner may be positioned, for example, on the front, back or side interior walls of the landing gear system, or in any other positions from which the components of the landing gear can be scanned by the lidar scanner.

Figure 3:
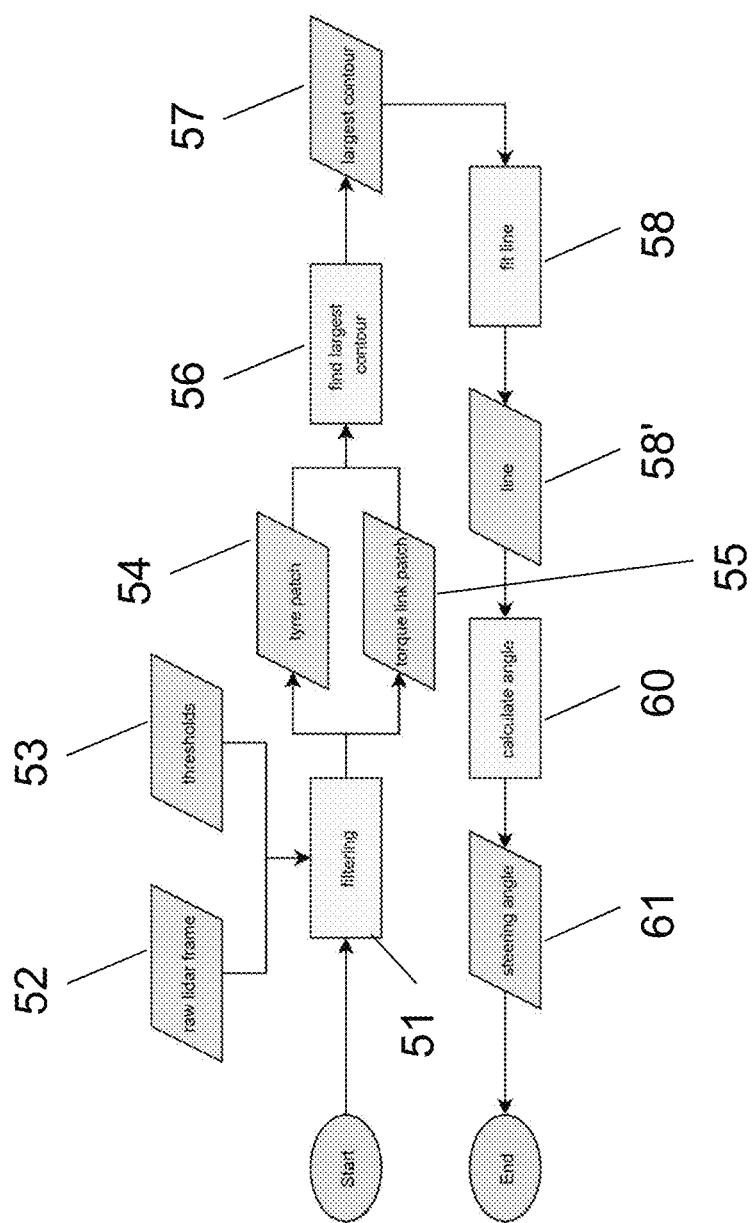
FIG. 3 shows a flowchart of a method of determining the steering angle of a landing gear assembly of an aircraft according to example embodiments of the invention.

A method of determining the steering angle of the nose landing gear 2 using the lidar scanner 15 is now described with reference to the flowchart of FIG. 3.

Figure 4A:
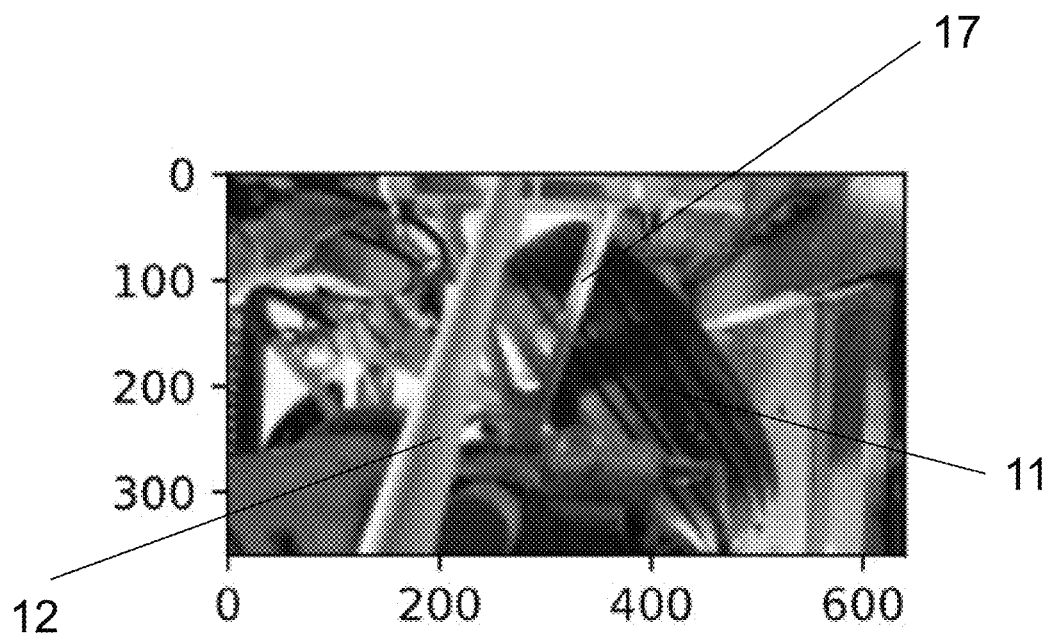
FIG. 4a shows a camera image of the nose landing gear in a first position, from above.

Initially, the lidar scanner 15 scans the area in which the wheel 11 and strut 12 of the nose landing gear 2 is extended. A camera image of the area scanned is shown in FIG. 4a. In addition to the wheel 11 and strut 12, in FIG. 2 the torque link 17 of the nose landing gear 2 can be seen. The torque link 17 is a hinged link between the piston and cylinder of the shock absorber of the nose landing gear 2, which allows the piston to move freely in and out of the cylinder, but prevents them rotating with respect to each other.

The scanning generates a raw lidar frame 52, i.e. a set of position data points obtained by the lidar scanner 15. Each position data point comprises three orthogonal position values. The position values for each position data point are determined by the lidar scanner 15 based on the direction its laser is pointing and the time the light of the laser takes to be returned, in accordance with standard methods.

The three orthogonal position values of the position data points are a horizontal positon value, a vertical position value, and a depth position value. The lidar scanner 15 is aligned with the centreline of the nose landing gear 2 (which is also the centreline of the aircraft 1), so that the horizontal positon value corresponds to a horizontal position as considered when facing the nose of the aircraft 1. The vertical position value corresponds to a position in a line from the nose to the tail of the aircraft 1, so that "higher" positions are closer to the nose. The depth position value corresponds to a distance from the lidar scanner 15, so that "deeper" positions are lower, i.e. further away from the top of the aircraft 1.

Figure 4B:
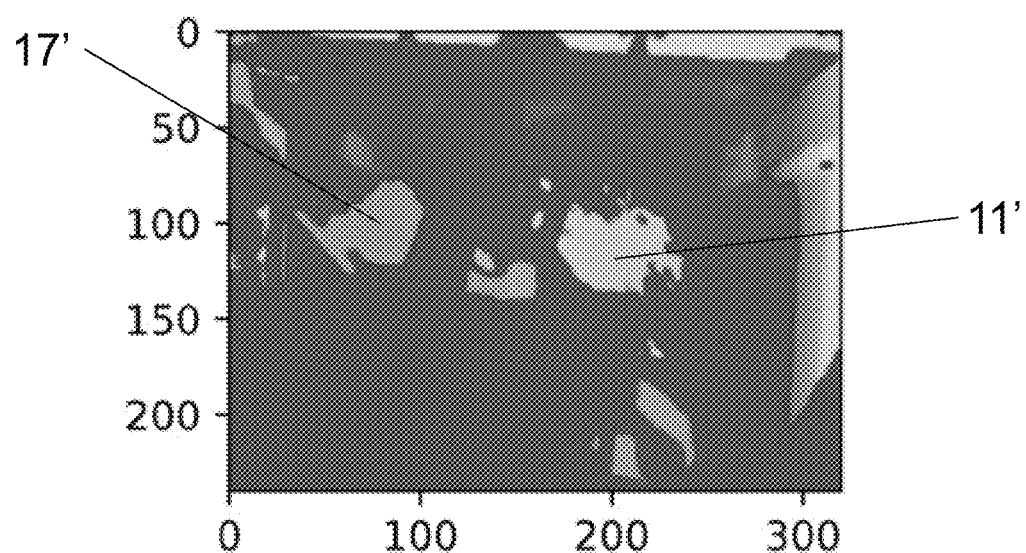

The set of position data points 52 obtained by scanning the nose landing gear 2 is shown in FIG. 4b as a colour-mapped image, on which the horizontal positon value of a position data point is indicated by the position of the plotted point on the horizontal axis, the vertical positon value is indicated by the position of the plotted point on the vertical axis, and the depth position values have been converted to colour values for the plotted points. As can be seen, there is a subset of position data points 11' corresponding to a patch of the wheel 11, which are yellow in colour based on their depth position values. In addition, there is a subset of position data points 17' corresponding to the torque link 17, which are green in colour based on their depth position values. Since the wheel 11 and torque link 17 are situated in distinct ranges of positions in the depth direction, they can easily be assigned different colours based on the depth position values.

There are also various other subsets of position data points in set of position data points 52, corresponding other parts of the nose landing gear 2, or of aircraft 1 generally, that are various different colours due to their depth position values.

Figure 5A:
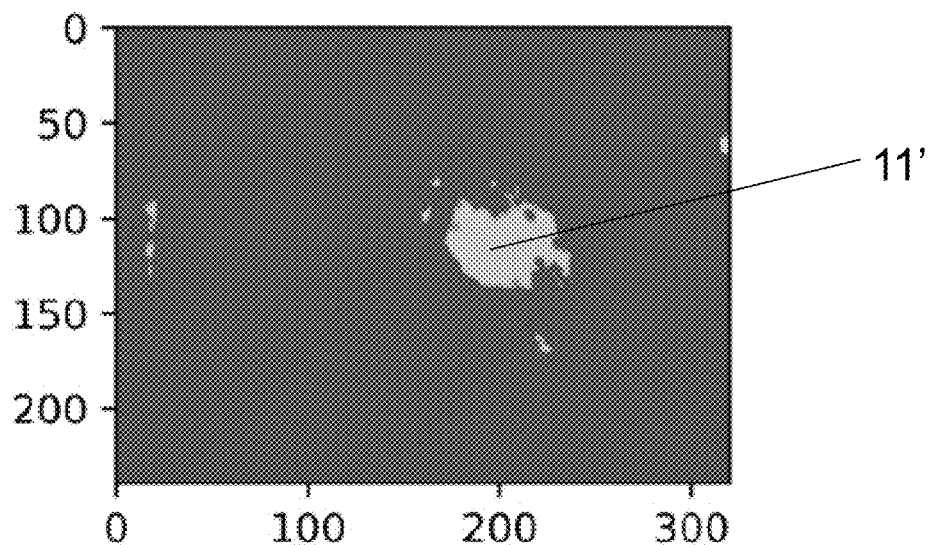
FIG. 5a shows a colour-mapped image representing the position data points of FIG. 4b, filtered to show only those corresponding to the wheel of the nose landing gear.

Once the set of position data points 52 has been obtained from the lidar scanner 15, thresholds 53 are used to remove outliers from the set of position data points (step 51). The thresholds 53 define maximum and minimum values for the depth position value of each position data point, with position data points with a depth position value outside the thresholds 53 being removed from the set of position data points. The removal of the position data points gives a filtered lidar frame, i.e. a filtered set of position data points, as shown in FIG. 5a again as a colour-mapped image. As can be seen, in this example the thresholds 53 have been chosen so that only subset of position data points 11' corresponding to the patch of the wheel 11 remain (plus a small number of other position data points relating to other components within the same range of depth position values). It will be appreciated that this can be done by selecting as the minimum threshold the depth position value corresponding to the closest any part of the wheel 11 is to the lidar scanner 15, and as the maximum threshold the depth position value corresponding to the furthest any desired part of the wheel 11 is from the lidar scanner 15.

It will be appreciated that thresholds may be applied to the horizontal and/or vertical position values as well. Further, particularly but not exclusively where the lidar scanner is mounted in a different position with respect to the landing gear, for example to the side of the landing gear, thresholds using only the horizontal and/or vertical position values may be used. Finally, thresholds may be based on combinations of the orthogonal position values.

Figure 6A:
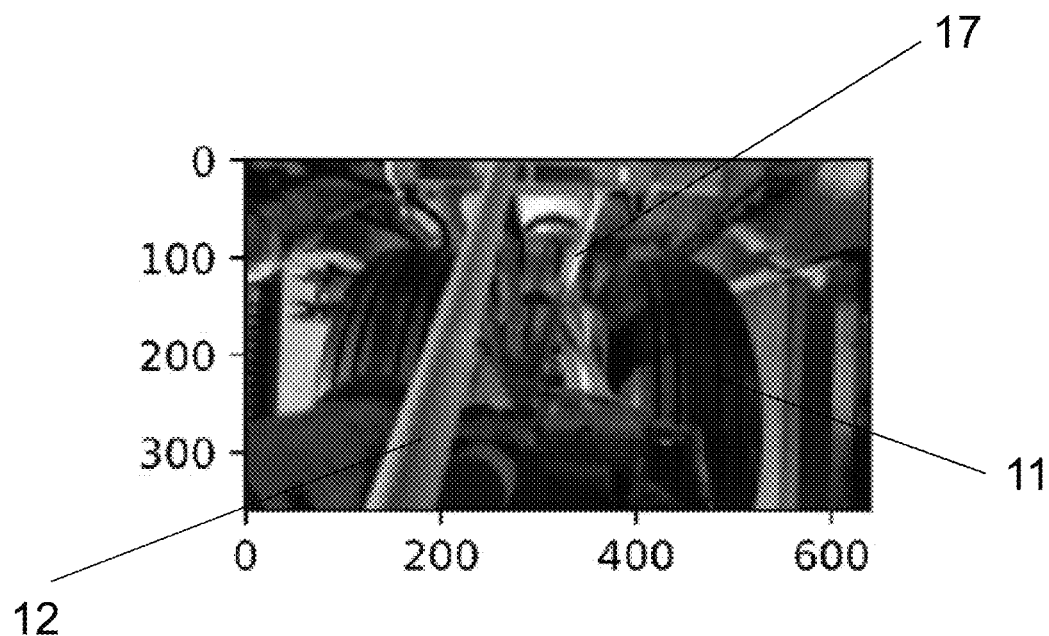
FIG. 6a shows a camera image of the nose landing gear in a second position, from above.
Figure 6B:
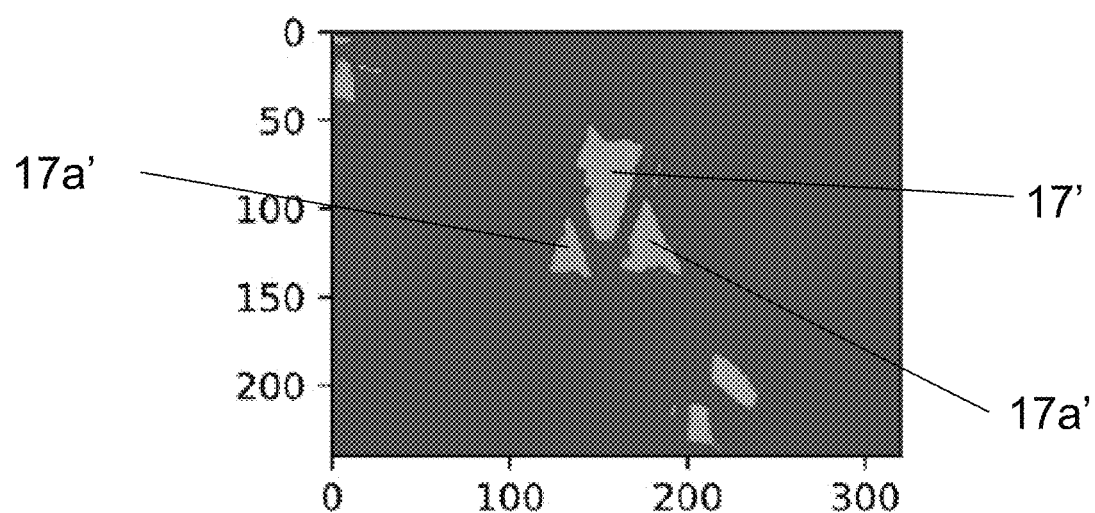
FIG. 6b shows a colour-mapped image representing position data points obtained by the lidar scanner for the nose landing gear in the position shown in FIG. 6a, filtered to show only those corresponding to the torque link of the nose landing gear.

A camera image of the area scanned by the lidar scanner 15 is shown in FIG. 6a, in which the steering angle of the nose landing gear 2 has changed so that the torque link 17 is more visible, due to not being obscured so much by the strut 12. The corresponding filtered set of position data points is shown in FIG. 6b, again as a colour-mapped image. As can be seen, in this example the thresholds 53 have been chosen so that only the subset of position data points 17' and 17a' corresponding to the torque link 17 remains (plus again a small number of other position data points relating to other components within the same range of depth position values).

While in the above embodiments the filtering is done to give a filtered set of position data points which includes only the subset of position data points 11' corresponding to the patch of the wheel 11 remains, or so that only the subset of position data points 17' and 17a' corresponding to the torque link 17 remain, in other embodiments the filtering may be done to give a filtered set of position data points which both subsets of position data points remain, and/or in which other subsets of position data points remain.

The above steps result in a subset of position data points 54 comprising the subset of position data points 11' corresponding to the patch of the wheel 11, and/or the subset of position data points 17' and 17 *a*' corresponding to the torque link 17. Prior to the next step, the subset of position data points 54 and the subset of position data points 55 are converted to black and white, i.e. the colour values assigned to the position data points based on the depth position values are removed. For clarity the colours are still shown in the following figures, and in other embodiments the following steps may be performed on the subsets of position data points 54 and 55 the color values still present.

Next, contouring algorithms are applied to the filtered set of position data points, to find all the contours in the filtered set of position data points. A contour is a curve that joins all the continuous points along the boundary of an area of a particular colour, so effectively a contour identifies the boundary. Many suitable contour-finding algorithms will be known to the skilled person. If a contour is below a desired area threshold, it is discarded.

Figure 5B:
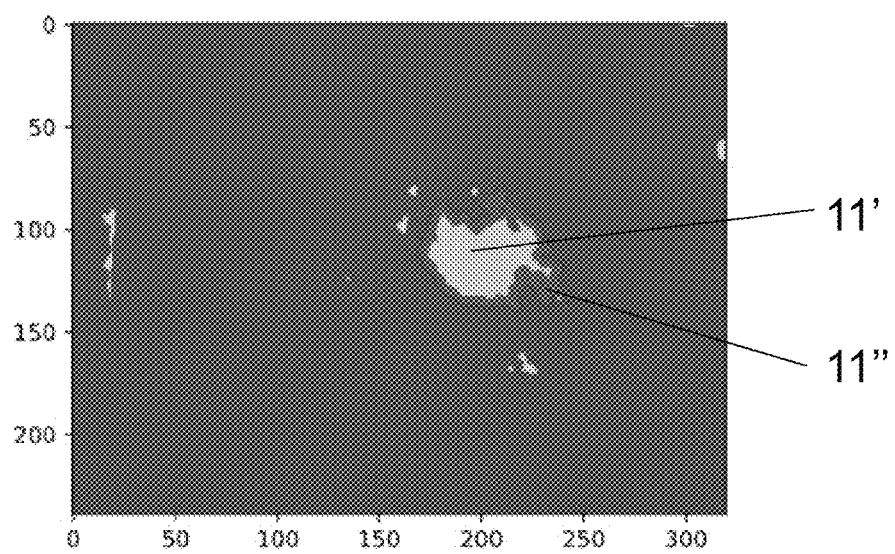
FIG. 5b shows a colour-mapped image representing the filtered position data points of FIG. 5a, with the boundary of the area corresponding to the wheel of the nose landing gear highlighted.
Figure 6C:
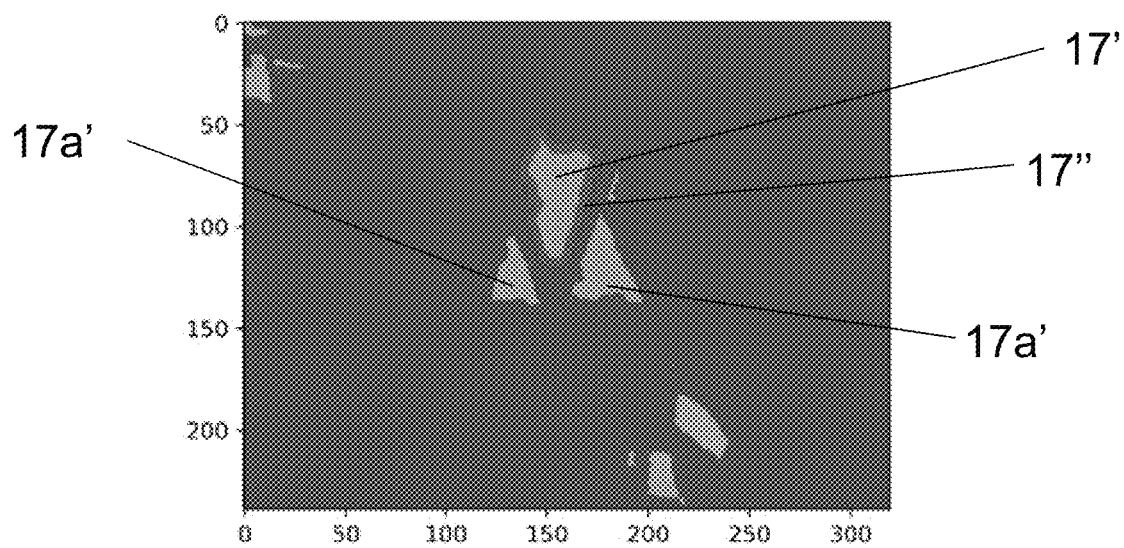
FIG. 6c shows a colour-mapped image representing the filtered position data points of FIG. 5a, with the boundary of the area corresponding to the torque link of the nose landing gear highlighted.
Figure 6D:
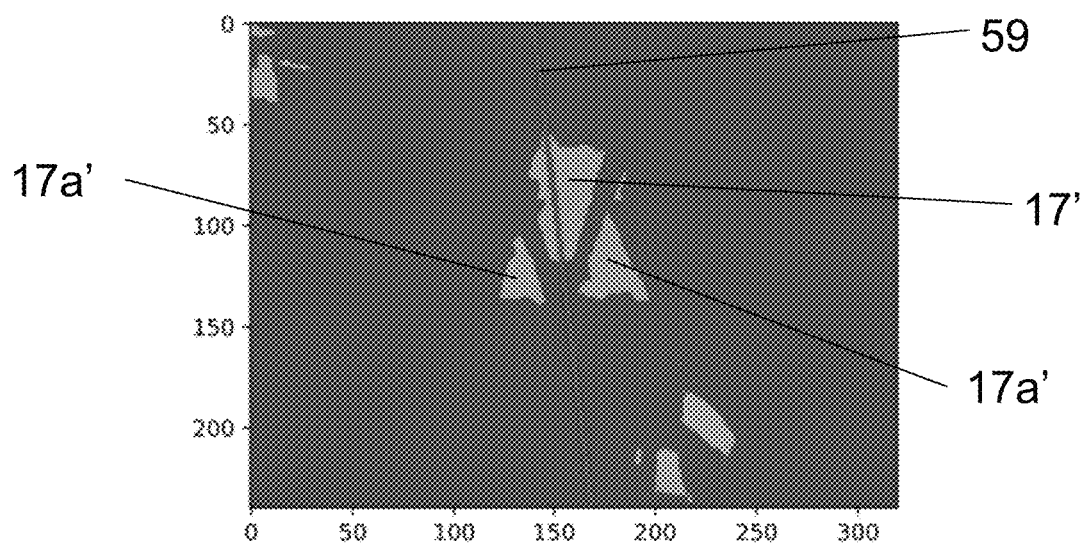
FIG. 6d shows a colour-mapped image representing the filtered position data points of FIG. 6c, with a best-fit line for the highlighted boundary.
Figure 7A:
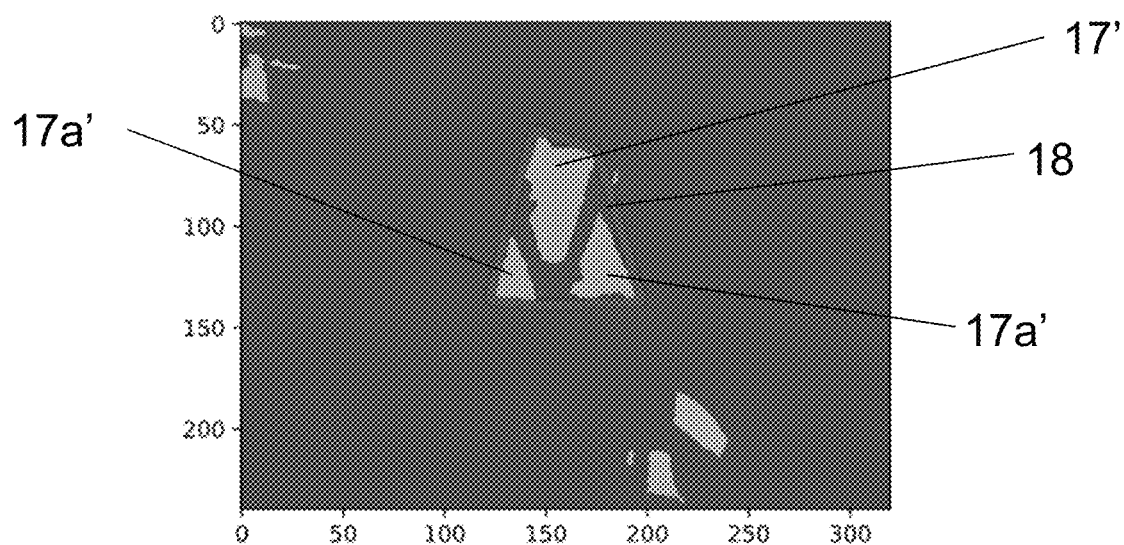
FIG. 7a shows a colour-mapped image representing the filtered position data points of FIG. 5a, with an alternative the boundary of the area corresponding to the torque link of the nose landing gear highlighted.

The contour 11" for the subset of position data points 11' corresponding to the patch of the wheel 11 is shown in FIG. 5*b*. A contour 17" for the subset of position data points 17' and 17*a*' corresponding to the torque link 17 is shown in FIG. 6*c*. As can be seen, the subset of position data points 17' and 17*a*' corresponding to the torque link 17 actually comprises a first larger subset of joined position data points 17', and second and third smaller subsets of joined position data points 17*a*'. Thus, the contour 17" is formed by the boundary of only the subset of joined position data points 17'. However, the second and third smaller joined subsets of position data points 17*a*' will each have their own contour, though they may be discarded as being below the desired area threshold. In other embodiments, a contour finding algorithm may be used that gives a contour 18 for all of the first larger subset of joined position data points 17' and second and third smaller subsets of joined position data points 17*a*', as shown in FIG. 7*a*. This can be done, for example, by increasing the distance there can be between two points on a boundary in order for the contour-finding algorithm to consider them to be connected.

The largest contour 57, i.e. the contour with the largest area, is then identified from the contours that have been found (step 56). In the present embodiment, this is the contour 17" for the subset of joined position data points 17' corresponding to a part of the torque link 17. It has been found that using the largest contour gives the most accurate results, thus the contour 17" may be selected in preference to the contour 11" on the basis of its size. However, it has been found that the wheels are less reliably scanned by lidar systems, due to the rubber surface of their tyres reflecting light in a dispersed manner, in comparison to torque links which are well detected due to their metallic surface. For this reason, only position data points corresponding the torque link 17 may be retained in the filtering step 51 discussed above, and position data points corresponding the wheel 11 discarded.

Figure 7B:
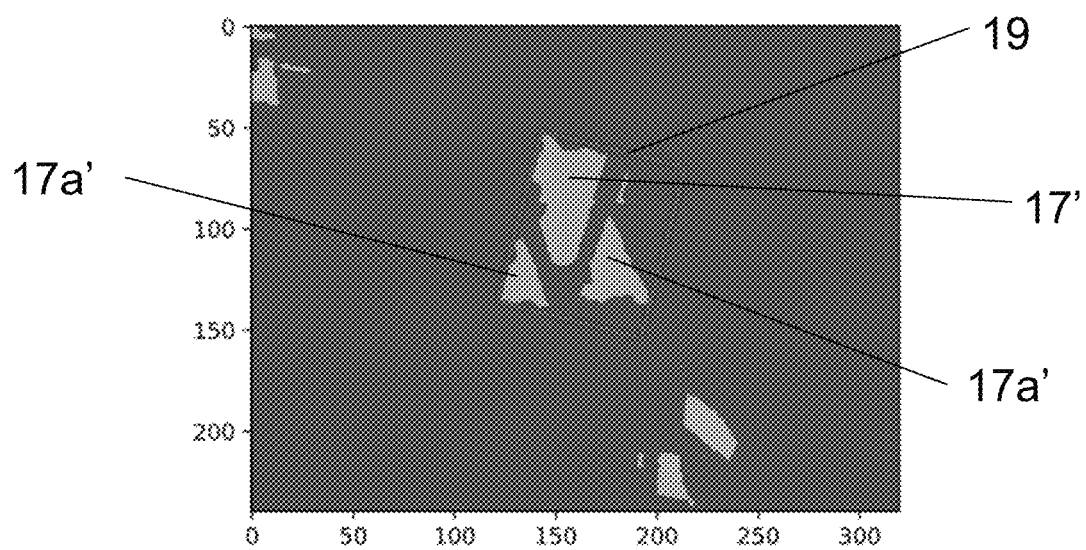
FIG. 7b shows a colour-mapped image representing the filtered position data points of FIG. 7a, with an alternative best-fit shape for the highlighted boundary.

A line 59 is then fit to the largest contour (step 58), using a best-fit algorithm. Various suitable best-fit algorithms will be known to the skilled person. In other embodiments, other shapes may be fit to the largest contour 57, for example a triangle, a rectangle 19 as shown in FIG. 7*b*, or any other appropriate shape. However, a line has been found to give the most accurate results.

Figure 8:
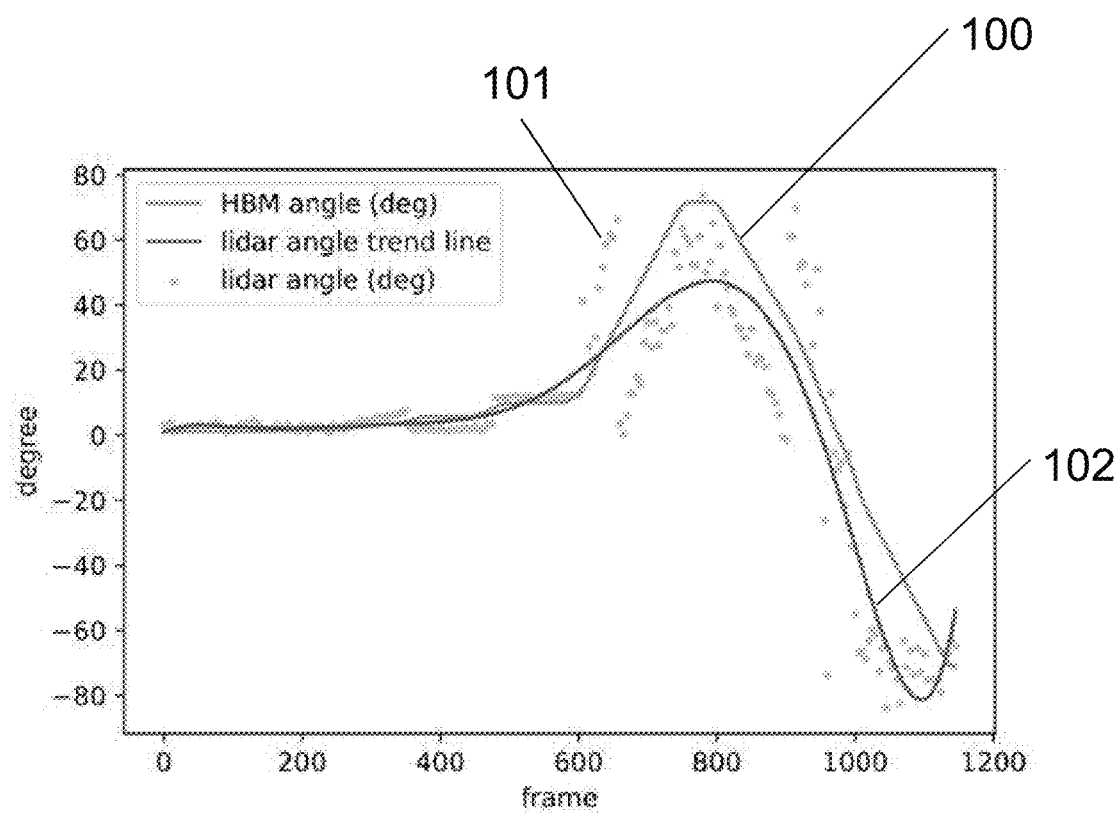
FIG. 8 is a plot of the nose landing gear steering angle and determined steering angle over time.

Finally, the steering angle 61 is determined from the determined line 58'. Because the lidar scanner 15 is aligned with the centreline of the nose landing gear 2, the y-axis can be taken as a reference line, allowing the steering angle 61 to be calculated 60 for the angle of the line 59. FIG. 8 is a plot showing the changing of actual nose landing gear steering angle 100, determined steering angle 101, and a trend line 102 for the determined steering angle 101, all as the actual nose landing gear steering angle 100 changes over time.

While the present invention has been described and illustrated with reference to particular embodiments, it will be appreciated by those of ordinary skill in the art that the invention lends itself to many different variations not specifically illustrated herein.

In particular, while the above embodiment has been described with reference to a nose landing gear, it will be appreciated that the invention is equally applicable to other steerable landing gear, such as steerable main landing gear, as well as to nose or other landing gear that operate in ways different to that described above, and/or that include different components to those described above. (For example steerable landing gear that have different wheel assemblies that operate in different ways, or that do not comprise wheels.)

While in the above embodiment the depth position value has been converted to a colour value, another image property value may be used, including a custom property value used only for the method. It will also appreciate that the colour values used may include or consist only of black, white and/or greys, or monochromes of different brightness.

While in the above embodiment the use of known best-fit algorithms has been described to determine the steering angle from the boundary, any other suitable algorithm, known or otherwise, may be used. To give just one example, an algorithm could be developed that determine the steering angle from the boundary shape and/or position using machine learning techniques, using a set of training data of identified boundaries for which the steering angle is known.

Where in the foregoing description, integers or components are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of determining a steering angle of a landing gear assembly of an aircraft, wherein the landing gear assembly comprises one or more wheels, and a lidar system is mounted inside a landing gear space above the one or more wheels of the landing gear assembly, wherein the landing gear assembly comprises a torque link, the method comprising steps of:

scanning the torque link of the landing gear assembly with the lidar system to generate a set of three-dimensional position data points, wherein each three-dimensional position data point comprises a set of three orthogonal position values;

generating a two-dimensional image from the set of three-dimensional position data points, by converting one of the three orthogonal positional values of each of the three-dimensional position data points to an image property value of a set of image property values;

identifying a boundary of an area of the two-dimensional image with the same image property values, wherein the area corresponds to a component of the landing gear assembly;

determining the steering angle of the landing gear assembly from a shape and/or orientation of the identified boundary, and using the determined steering angle of the landing gear assembly to extend or retract the landing gear assembly.

2. A method as claimed in claim 1, wherein the three orthogonal position values of the position data point are a horizontal position value, a vertical position value and a depth position value.

3. A method as claimed in claim 2, wherein the depth position value is indicative of a position along a line from the lidar system to the landing gear assembly.

4. A method as claimed in claim 2, wherein the converted position value is the depth position value.

5. A method as claimed in claim 1, wherein the landing gear assembly comprises one or more wheels, and the lidar system is mounted above the one or more wheels of the landing gear assembly.

6. A method as claimed in claim 1, wherein the image property value a color value.

7. A method as claimed in claim 1, wherein each image property value of the set of image property values corresponds to a range of the converted position values, and the converted position value of a three-dimensional position data point is converted to an image property value of the set of image property values when the converted position value is in the range of converted position values corresponding to the image property value.

8. A method as claimed in claim 7, wherein the landing gear assembly comprises a torque link, and wherein an image property value of the set of image property values has a range of converted position values within which the torque link of the landing gear assembly is positioned when the landing gear assembly is extended.

9. A method as claimed in claim 7, wherein the landing gear assembly comprises one or more wheels, and wherein an image property value of the set of image property values has a range of converted position values within which the one or more wheels of the landing gear assembly are positioned when the landing gear assembly is extended.

10. A method as claimed in claim 1, wherein the lidar system is positioned in the aircraft so that the lidar system scans the landing gear assembly from above.

11. A method as claimed in claim 1, further comprising, prior to the step of generating the two-dimensional image from the set of three-dimensional position data points, a step of removing three-dimensional position data points from the set of three-dimensional position data points that have a converted position value greater than a threshold value.

12. A method as claimed in claim 1, further comprising, prior to the step of generating the two-dimensional image from the set of three-dimensional position data points, the step of removing three-dimensional position data points from the set of three-dimensional position data points that have a converted position value less than a threshold value.

13. A method as claimed in claim 1, wherein the steering angle of the landing gear assembly is determined from the orientation of the identified boundary by determining a best-fit line for the boundary.

14. A method as claimed in claim 1, wherein the landing gear assembly comprises a torque link, and wherein the area of which the boundary is identified corresponds to the torque link of the landing gear assembly.

15. A method as claimed in claim 1, wherein the landing gear assembly is a nose landing gear assembly.

16. An aircraft, comprising:
a landing gear assembly comprising one or more wheels, wherein the landing gear assembly comprises a torque link;
a lidar system mounted inside a landing gear space above the one or more wheels of the landing gear assembly, and arranged to scan the torque link of the landing gear assembly and generate a set of three-dimensional position data points, wherein each position data point comprises a set of three orthogonal position values; and
a computer system arranged to determine, from the set of three-dimensional position data points, a steering angle of the landing gear assembly in accordance with a method comprising steps of:
scanning the landing gear assembly with the lidar system to generate the set of three-dimensional position data points, wherein each three-dimensional position data point comprises the set of three orthogonal position values;
generating a two-dimensional image from the set of three-dimensional position data points, by converting one of the three orthogonal positional values of each of the three-dimensional position data points to an image property value of a set of image property values;
identifying a boundary of an area of the two-dimensional image with the same image property values, wherein the area corresponds to a component of the landing gear assembly;
determining the steering angle of the landing gear assembly from a shape and/or orientation of the identified boundary.

17. An aircraft as claimed in claim 16, wherein the landing gear assembly is a nose landing gear assembly.

18. A non-transitory computer readable medium comprising computer-readable program code for determining a steering angle of a landing gear assembly of an aircraft, the computer-readable program code arranged, when executed in a computer system of the aircraft comprising:
a landing gear assembly comprising one or more wheels, wherein the landing gear assembly comprises a torque link; and
a lidar system mounted inside a landing gear space above the one or more wheels of the landing gear assembly and arranged to scan the landing gear assembly and generate a set of three-dimensional position data points, wherein each position data point comprises a set of three orthogonal position values;
to cause the computer system to determine, from the set of three-dimensional position data points, the steering angle of the landing gear assembly in accordance with a method comprising steps of:
scanning the landing gear assembly with the lidar system to generate the set of three-dimensional position data points, wherein each three-dimensional position data point comprises the set of three orthogonal position values;

generating a two-dimensional image from the set of three-dimensional position data points, by converting one of the three orthogonal positional values of each of the three-dimensional position data points to an image property value of a set of image property values;

identifying a boundary of an area of the two-dimensional image with the same image property values, wherein the area corresponds to a component of the landing gear assembly;

determining the steering angle of the landing gear assembly from a shape and/or orientation of the identified boundary; and using the determined steering angle of the landing gear assembly to steer the aircraft.

* * * * *